US 12,517,786 B2

(12) United States Patent
Srikanth et al.

(10) Patent No.: US 12,517,786 B2
(45) Date of Patent: Jan. 6, 2026

(54) ADAPTIVE FLOATING POINT INFERENCE PERFORMANCE FOR SYSTEMS WITH UNRELIABLE MEMORY

(71) Applicant: Advanced Micro Devices, Inc., Santa Clara, CA (US)

(72) Inventors: Sriseshan Srikanth, Santa Clara, CA (US); SeyedMohammad SeyedzadehDelcheh, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 933 days.

(21) Appl. No.: 17/705,066

(22) Filed: Mar. 25, 2022

(65) Prior Publication Data

US 2023/0306256 A1 Sep. 28, 2023

(51) Int. Cl.
*G06F 11/00* (2006.01)
*G06F 11/10* (2006.01)
*G06N 3/08* (2023.01)

(52) U.S. Cl.
CPC ........ *G06F 11/1072* (2013.01); *G06F 11/102* (2013.01); *G06F 11/1044* (2013.01); *G06N 3/08* (2013.01)

(58) Field of Classification Search
CPC ............... G06F 11/1072; G06F 11/102; G06F 11/1044; G06F 11/0727; G06N 3/08
See application file for complete search history.

(56) References Cited

U.S. PATENT DOCUMENTS

| 8,407,271 | B2 | 3/2013 | Hurd et al. | |
|---|---|---|---|---|
| 8,489,663 | B2 | 7/2013 | Wang | |
| 9,448,883 | B1* | 9/2016 | Shrader | G06F 11/1072 |
| 9,477,587 | B2* | 10/2016 | Wong | G06F 3/0604 |
| 2011/0082976 | A1* | 4/2011 | Wu | G11C 11/56 |
| | | | | 711/E12.001 |
| 2013/0007355 | A1* | 1/2013 | Radke | G11C 11/5628 |
| | | | | 711/E12.008 |
| 2022/0067525 | A1* | 3/2022 | Sequeira | B60W 10/04 |

* cited by examiner

*Primary Examiner* — Joseph D Manoskey
(74) *Attorney, Agent, or Firm* — Kowert, Hood, Munyon, Rankin & Goetzel, P.C.; Rory D. Rankin

(57) ABSTRACT

Systems, apparatuses, and methods for scattering floating point values to heterogeneous memory devices are disclosed. An inference engine performs floating point calculations during pre-training and during post-training operations. A scatter unit stores the floating point number values in multiple memories with different error correction capabilities. A first portion of each floating point number value is stored in a first memory having a relatively high error correction capability, and a second portion of each floating point number value is stored in a second memory with a relatively low error correction capability. In one scenario, the first portion includes the sign and exponent fields, while the second portion includes the mantissa field. The resiliency of the inference engine to overcome small errors allows for convergence to the final result in spite of any errors in the retrieved second portion.

20 Claims, 9 Drawing Sheets

ADAPTIVE FLOATING POINT INFERENCE PERFORMANCE FOR SYSTEMS WITH UNRELIABLE MEMORY

BACKGROUND

Description of the Related Art

Memory devices include error correction mechanisms to protect from errors when storing data. For example, checkbits (i.e., error bits) can be used to detect and/or correct bit errors in data stored in the data arrays of memory devices. The checkbits are stored in extra memory locations alongside the original data bits in the data memory locations. In some cases, the error correction codes (ECCs) can be single-error correcting, double-error detecting (SEC-DED) codes. Using a SEC-DED code, single-bit errors can be corrected and two-bit errors can be detected in corresponding data. Other error correction codes include double-error correcting, triple error detecting (DEC-TED) codes, triple-error correcting, quadruple error detecting (TEC-QED) codes, and so on. The increase in the ability to detect and correct for errors also increases the extra space needed for storing the checkbits. However, the extra memory locations are an additional overhead unable to be used by the actual data being stored. Accordingly, techniques for reducing the error correction overhead are desired.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for achieving resilient floating point inference performance when accessing unreliable memory are disclosed herein. In one implementation, a system includes at least an inference engine, a scatter unit, and first and second memory devices. The first memory device utilizes a relatively high error correction capability with a relatively large percentage of error correction bits compared to data bits available for storage. The second memory device utilizes a relatively low error correction capability with a relatively small percentage of error correction bits compared to data bits available for storage. In one implementation, the scatter unit receives floating point numbers from the inference engine to be stored by the scatter unit. The scatter unit sends at least a first portion of each floating point number to the first memory device and at least a second portion of each floating point number to the second memory device. In one implementation, the first portion includes the sign field and the exponent field of the floating point number, and the second portion includes the mantissa field of the floating point number. The sign field and exponent field are more important for preserving the original numerical value as compared to the mantissa field, so the sign field and exponent field are stored in the more resilient memory while the mantissa field is stored in the less resilient memory. The resiliency of the inference engine allows it to converge regardless of small errors in the calculation values. Accordingly, having a small number of potential errors in the mantissa field will not affect the final training result.

Figure 1:
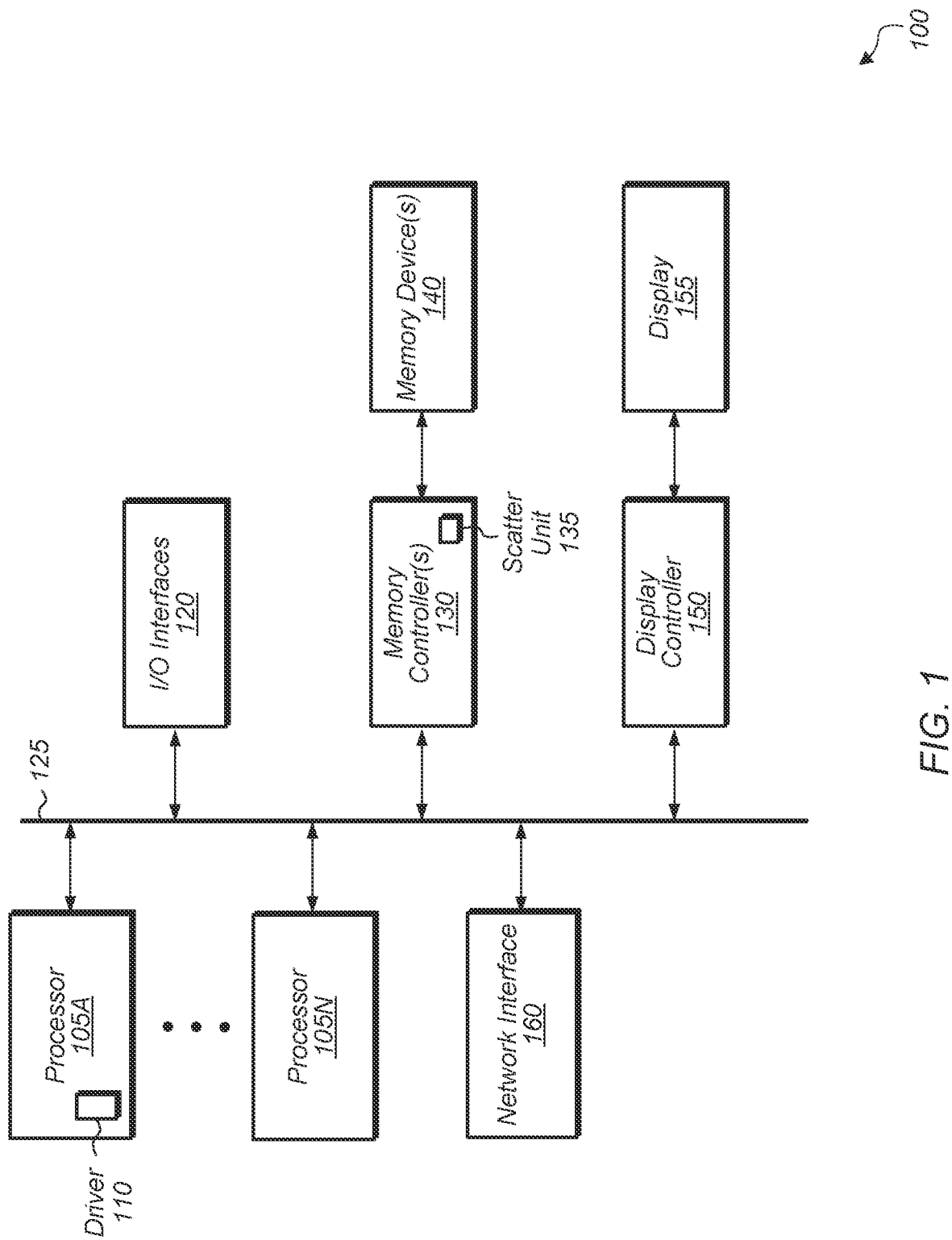
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 160, memory device(s) 140, display controller 150, and display 155. In other implementations, computing system 100 includes other components, omits one or more of the components shown, and/or computing system 100 is arranged differently. Processors 105A-N are representative of any number of processors which are included in system 100.

In one implementation, processor 105A is a general-purpose processor, such as a central processing unit (CPU). In this implementation, processor 105A executes a driver 110 (e.g., graphics driver) for communicating with and/or influencing (e.g., controlling) the operation of one or more of the other processors in system 100. In one implementation, processor 105N is a data parallel processor with a highly parallel architecture, such as a dedicated neural network accelerator or a graphics processing unit (GPU) which provides pixels to display controller 150 to be driven to display 155. Other data parallel processors that can be included in system 100 include digital signal processors (DSPs), field programmable gate arrays (FPGAs), application specific integrated circuits (ASICs), and so forth. In some implementations, processors 105A-N include multiple data parallel processors.

An emerging technology field is machine learning, with a neural network being one type of a machine learning model. Neural networks have demonstrated excellent performance at tasks such as hand-written digit classification and face detection. Other applications for neural networks include speech recognition, language modeling, sentiment analysis, text prediction, and many others. In one implementation, processor 105N is a data parallel processor programmed to execute one or more neural network applications.

Memory controller(s) 130 are representative of any number and type of memory controllers accessible by processors 105A-N. While memory controller(s) 130 are shown as being separate from processors 105A-N, it should be understood that this merely represents one possible implementation. In other implementations, a memory controller 130 can be located on the same semiconductor die as one or more of processors 105A-N and/or a memory controller 130 can be embedded within one of processors 105A-N. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

In one implementation, at least one memory controller 130 includes a scatter unit 135 for writing different portions of numerical representation values to multiple different memory devices 140. For example, scatter unit 135 writes the relatively more important portions of numerical representation values to a first memory device 140 with a relatively high error correction capability while writing the relatively less important portions of numerical representation values to a second memory device 140 with a relatively low error correction capability. Generally speaking, scatter unit 135 writes more important data to the more reliable first memory device 140 while writing less important to the less reliable second memory device 140. For example, in another implementation, scatter unit 135 writes program instructions executable by a processor to the more reliable first memory device 140 while computation results to the less reliable second memory device 140. In other implementations, scatter unit 135 uses other schemes for partitioning and storing other types of data in the more reliable first memory device 140 and the less reliable second memory device 140. More details on the operation of scatter unit 135 will be provided throughout the remainder of this disclosure. In another implementation, scatter unit 135 is a standalone unit or is incorporated within other components besides memory controller(s) 130.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, and so forth. Network interface 160 is able to receive and send network messages across a network. Bus 125 is representative of any number and type of interfaces, communication fabrics, and/or other connectivity for connecting together the different components of system 100.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
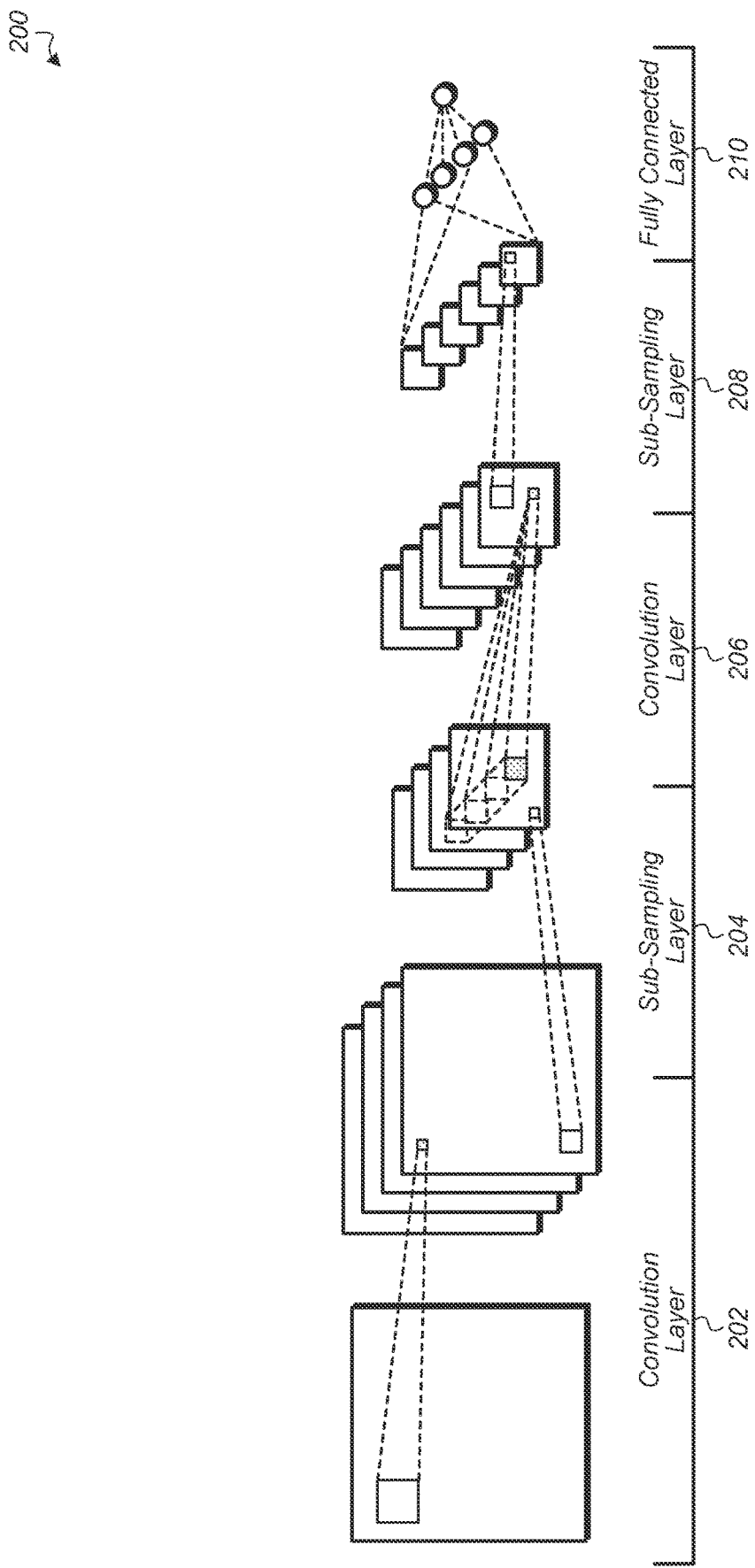
FIG. 2 is a block diagram of one implementation of a portion of a neural network.

Turning now to FIG. 2, a block diagram of one implementation of a portion of a neural network 200 is shown. It is noted that the example of the portion of neural network 200 is merely intended as an example of a neural network that can be trained and used by various applications. The example of neural network 200 does not preclude the use of other types of neural networks with the various methods and mechanisms described herein. The training of a neural network can be performed using reinforcement learning (RL), supervised learning, or imitation learning in various implementations. It is noted that a trained neural network can use convolution, fully connected, long short-term memory (LSTM), gated recurrent unit (GRU), and/or other types of layers.

The portion of neural network 200 shown in FIG. 2 includes convolution layer 202, sub-sampling layer 204, convolution layer 206, sub-sampling layer 208, and fully connected layer 210. Neural network 200 can include multiple groupings of layers similar to those shown sandwiched together to create the entire structure of the network. The other groupings of layers that are part of neural network 200 can include other numbers and arrangements of layers than what is shown in FIG. 2. It is noted that layers 202-210 are merely intended as an example of a grouping of layers that can be implemented in back-to-back fashion in one particular embodiment. The arrangement of layers 202-210 shown in FIG. 2 does not preclude other ways of stacking layers together from being used to create other types of neural networks.

When implementing neural network 200 on a computing system (e.g., system 100 of FIG. 1), neural network 200 stores various numerical values in multiple heterogeneous memory devices. The heterogeneous memory devices have different error correction capability profiles in one implementation. In another implementation, the multiple memory devices are homogeneous but have different expected error rates. For example, in this implementation, a first memory device is a given type of solid-state device (SSD) of a first age, and a second memory device is the given type of SSD having a second age older than the first age. Alternatively, the first and second memory devices may have the same age but have undergone different numbers of write cycles. In these scenarios, the second memory device is more likely than the first memory device to return incorrect data when responding to a request to retrieve stored data. In other implementations, other factors may affect the reliability or expected error rates of different types of memory devices. Neural network 200 has resiliency against small errors in the stored values, allowing the less important portions of the numerical values to be stored in less reliable memory devices while the more important portions of the numerical values are stored in more reliable memory devices. This helps to ensure that any errors that occur only result in relatively small changes to the stored values. Examples of different scattering schemes that can be employed will be described throughout the remainder of this disclosure.

Figure 3:
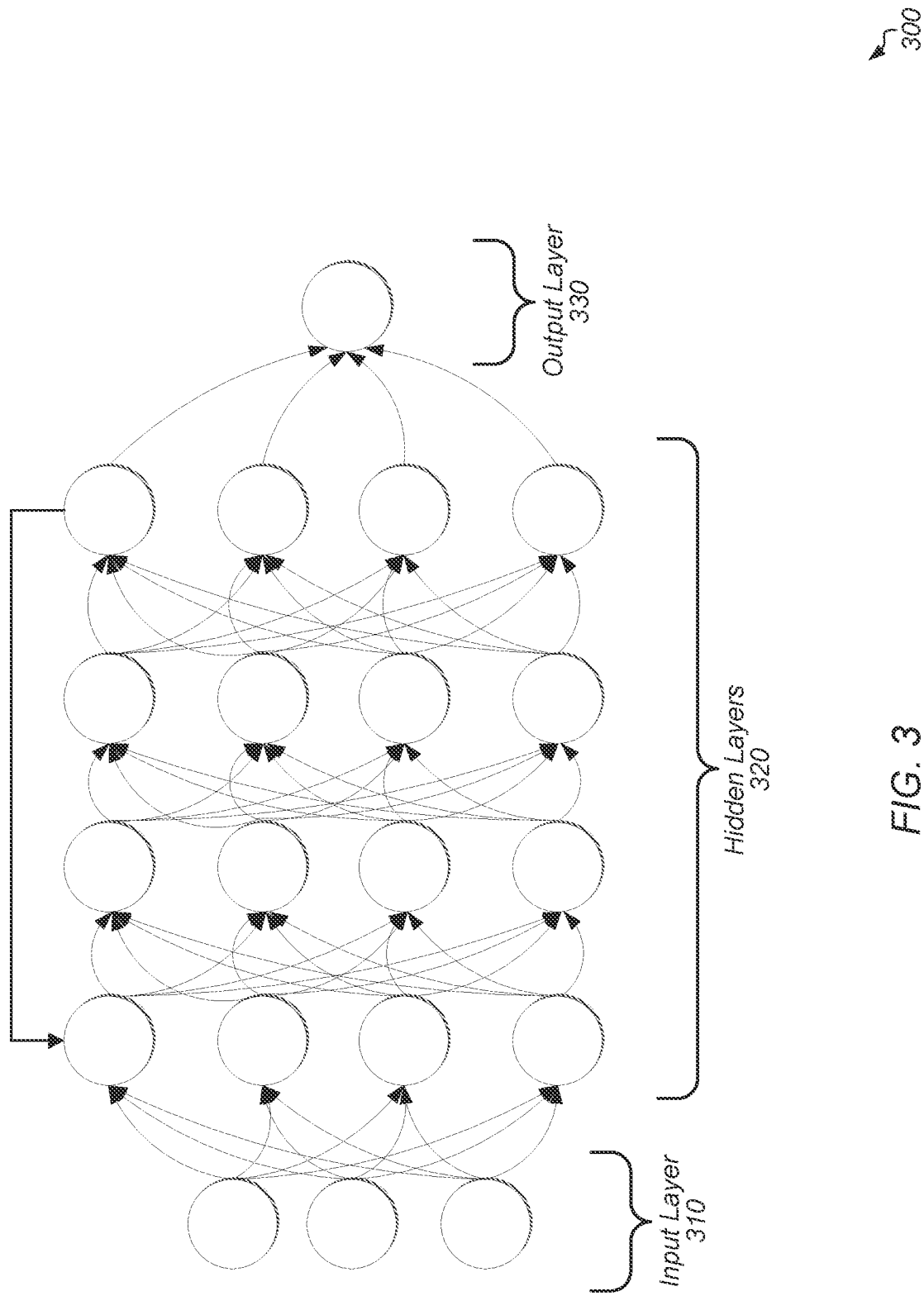
FIG. 3 is a block diagram of another implementation of a neural network.

Referring now to FIG. 3, a block diagram of another implementation of a neural network 300 is shown. Neural network 300 illustrates another example of a neural network that can be implemented on a computing system (e.g., system 100 of FIG. 1). In one implementation, neural network 300 is a recurrent neural network (RNN) and includes at least input layer 310, hidden layers 320, and output layer 330. Hidden layers 320 are representative of any number of hidden layers, with each layer having any number of neurons. Neurons that are used for RNNs include long short-term memory (LSTM), gated recurrent unit (GRU), and others. Also, any number and type of connections between the neurons of the hidden layers may exist. Additionally, the number of backward connections between hidden layers 320 can vary from network to network. In other implementations, neural network 300 includes other arrangements of layers and/or other connections between layers that are different from what is shown in FIG. 3. In some cases, neural network 300 can include any of the layers of neural network 200 (of FIG. 2). In other words, portions or the entirety of convolutional neural networks (CNNs) can be combined with portions or the entirety of RNNs to create a single neural network. Also, any intermixing of neural network types together can be employed, such as intermixing fully connected and other neural network nodes. Examples of other network topologies that can be used or combined together with other networks include generative-adversarial networks (GANs), attention models, transformer networks, RNN-Transduce networks and their derivatives, and others.

In one implementation, as part of an environment where supervised learning is used to direct reinforcement learning, neural network 300 processes an input dataset to generate result data. During processing of the input dataset, many numerical values are typically generated. The numerical values can be stored in multiple different types of memory devices. Rather than having all of these memory devices utilize the same type of error correction capability, different error correction capabilities can be used for different devices. In one implementation, for each numerical value that is stored, a scatter unit (e.g., scatter unit 135 of FIG. 1) stores one or more first portions in a first memory device with a relatively strong error correction capability while storing one or more second portions in a second memory device with a relatively weak error correction capability. In this implementation, the first portions are relatively more important than the second portions for affecting the fidelity of subsequent calculations. When reading numerical values back for further processing by neural network 300, the scatter unit retrieves the separate portions from the first and second memory devices and reconstructs the numerical values.

Figure 4:
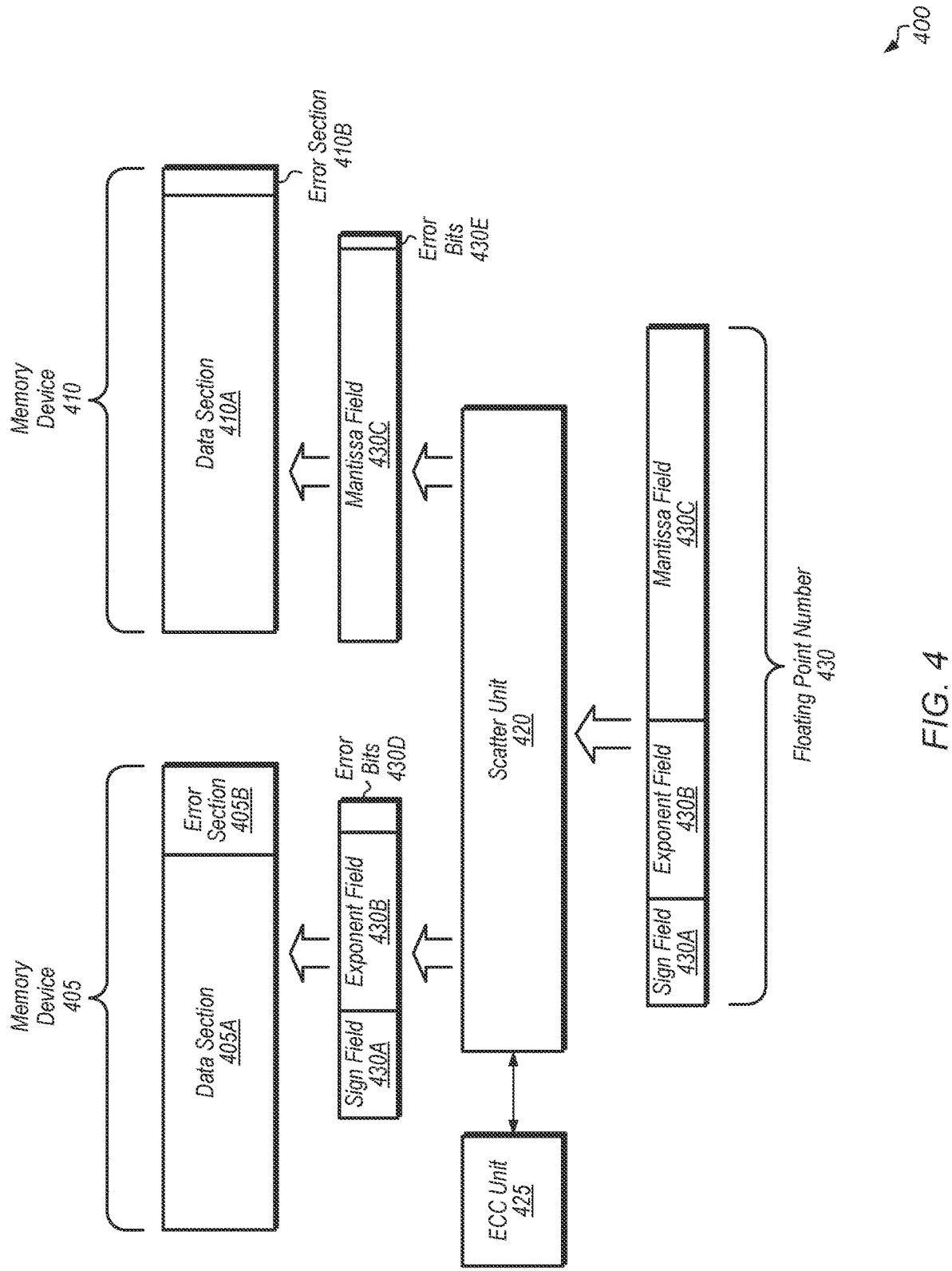
FIG. 4 is a block diagram of one implementation of an apparatus for scattering portions of numerical values to multiple memories.

Turning now to FIG. 4, a block diagram of one implementation of an apparatus 400 for scattering portions of numerical values to multiple memories is shown. In one implementation, apparatus 400 includes at least scatter unit 420, error correction code (ECC) unit 425, and memory devices 405 and 410. It is noted that apparatus 400 can include any number of other components (e.g., processing device(s), inference engine, memory controller(s), communication fabric) that are not shown to avoid obscuring the figure. Also, the structure of apparatus 400 and/or the connections between components that are shown in FIG. 4 are merely representation of one particular implementation. In other implementations, other types of structures and/or connections between components can be employed.

In one implementation, memory device 405 includes memory locations which can be partitioned into data section 405A for storing the actual data being used by programs and error section 405B for storing error correction bits corresponding to the actual data. In one implementation, ECC unit 425 generates the error correction bits which are stored in error section 405B, with the error correction bits generated based on the actual data. Then, in the cases when there is a faulty memory location that corrupts the actual data stored in data section 405A, the error correction bits stored in error section 405B can be used to correct for the errors, allowing the actual data to be reconstructed accurately. However, there is the possibility that too many errors in the data section 405A prevent the error correction bits from being able to reconstruct the actual data. Therefore, there is a tradeoff between reducing extra space required by error section 405B and the ability to correct for more errors.

In one implementation, ECC unit 425 is a dual-mode ECC engine which accommodates two sets of codes. In another implementation, ECC unit 425 reuses a subset of the ECC checkbits from the stronger code to generate or check the weaker ECC checkbits. In other implementations, ECC unit 425 can support more than two different sets of codes. It is noted that while ECC unit 425 is shown as a standalone unit in FIG. 4, this is merely indicative of one particular implementation. In another implementation, memory device 405 has its own ECC unit which is incorporated within the device. Similarly, memory device 410 can have its own ECC unit. Alternatively, ECC unit 425 can be incorporated within scatter unit 420 in another implementation or ECC unit 425 can be incorporated within a memory controller (not shown). Other locations and arrangements of ECC units are possible and are contemplated.

Memory device 410 includes data section 410A and error section 410B. As compared to error section 405B of memory device 405, error section 410B is smaller (i.e., has fewer bits per corresponding portion of data section 410A) than error section 405B. It is noted that the construction of error section 405B to be relatively large and error section 410B to be relatively small is by design. More important data is intended to be stored in memory device 405 while less important data is stored in memory device 410. Having a smaller error section 410B allows more data to be stored in memory device 410 while this data is more likely to be impacted by random errors and failures in individual memory locations. It is noted that in some cases, memory device 410 may forgo an error section entirely and only include a data section. In these cases, memory device 410 will not have any ability to detect or correct for errors.

As shown in FIG. 4, scatter unit 420 receives floating point number 430 for storage. In one implementation, scalar unit 420 receives only floating point number 430 for storage. In another implementation, scalar unit 420 receives a plurality of floating point numbers (of which floating point number 430 is one) for storage. In this implementation, a vector instruction is executed, with the vector instruction specifying a plurality of floating point numbers which are intended to be stored. For the implementation when a vector instruction is executed, the other floating point numbers can be treated in a similar manner to floating point number 430 as described herein. Floating point number 430 includes three fields which are sign field 430A, exponent field 430B, and mantissa field 430C. The sizes of these fields can vary based on whether floating point number 430 is a single-precision or double-precision floating point number as defined by the Institute of Electrical and Electronics Engineers (IEEE) standards. It is also possible for other types of floating point numbers to be used that are meet neither the single-precision or double-precision IEEE standard definition. These other types of floating point numbers can be custom types, proprietary types, or future enhancements to the IEEE standards.

As shown in FIG. 4, scatter unit 420 sends sign field 430A, exponent field 430B, and error bits 430D to memory device 405 for storage therein. Also, scatter unit 420 sends mantissa field 430C and error bits 430E to memory device 410 for storage therein. In cases where memory devices 405 and 410 have their own ECC unit, memory devices 405 and 410 will generate the error bits in these cases and scatter unit 420 will only send the original fields of floating point number 430. It is noted that other floating point numbers received by scatter unit 420 can be partitioned in a similar manner when stored on memory devices 405 and 410.

The rationale behind the scattering of fields to the various memory devices is that the sign field 430A and exponent field 430B are relatively more important to the subsequent calculations that will be performed using floating point number 430. Also, the mantissa field 430C is relatively less important to the subsequent calculations that will be performed using floating point number 430. Consequently, errors that may occur when storing sign field 430A and exponent field 430B in memory device 405 are more likely to be corrected based on the enhanced error correction capability utilized by memory device 405 and the relatively large size of error section 405B. Errors that may occur when storing mantissa field 430C in memory device 410 are less likely to be corrected due to the reduced error correction capability utilized by memory device 410 and the relatively small size of error section 410B. However, errors in mantissa field 430C will have a relatively smaller impact on the subsequent calculations that will be performed on floating point number 430. In cases where an inference engine is operating on floating point number 430 and other floating point numbers which are similarly partitioned, the resilience of the inference engine will allow it to overcome small errors in the floating point numbers without affecting the final result.

It is noted that the particular partition scheme shown in FIG. 4 is merely indicative of one particular implementation. Other implementations may employ other partition schemes that differ from the scheme shown in FIG. 4. It is further noted that scatter unit 420 can also be referred to herein as scatter circuit 420 or scatter engine 420.

Figure 5:
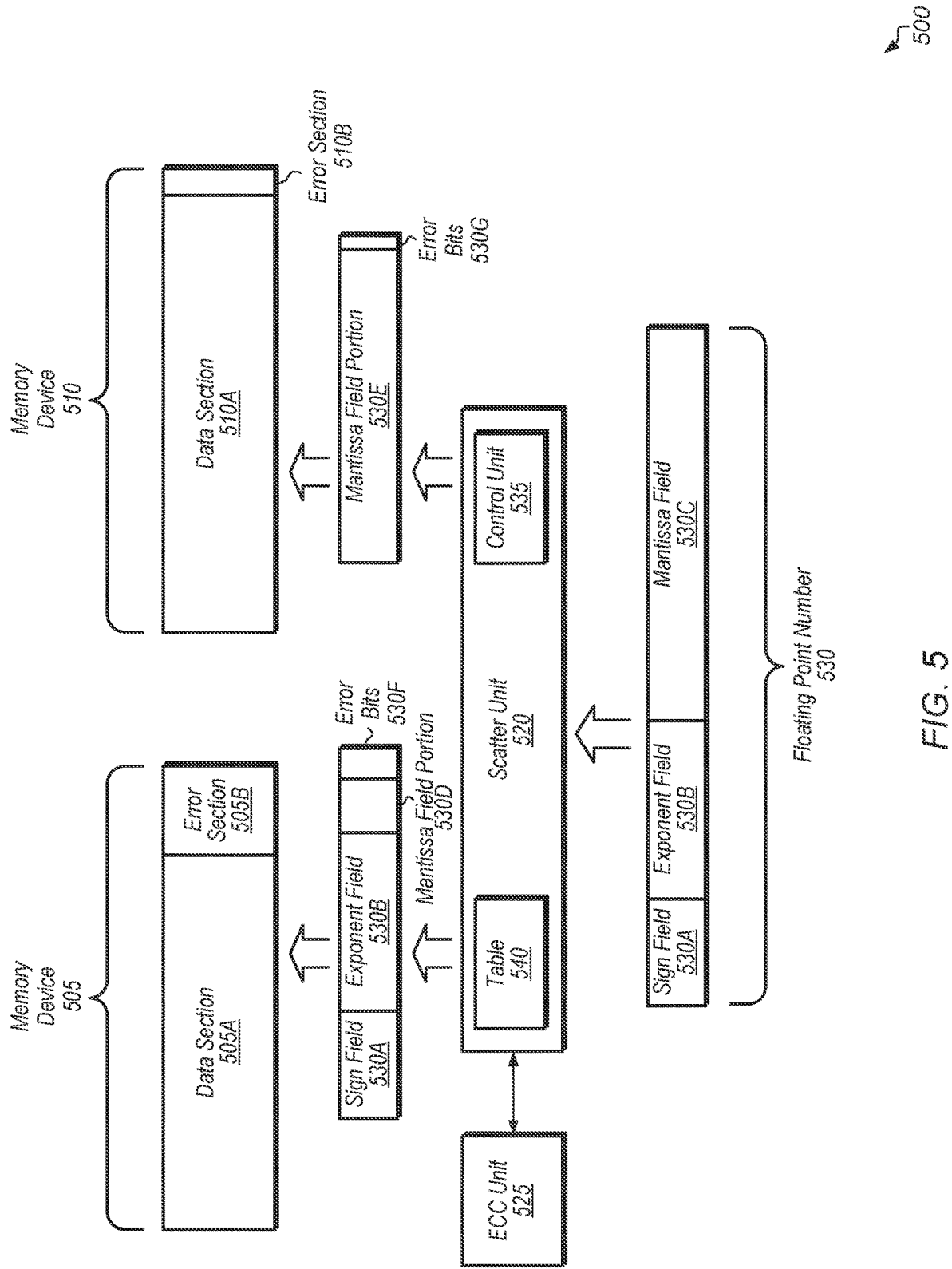
FIG. 5 is a block diagram of one implementation of a system for scattering numerical values to multiple heterogeneous memories.

Referring now to FIG. 5, a block diagram of one implementation of a system 500 for scattering numerical values to multiple heterogeneous memories is shown. System 500 includes at least scatter unit 520, ECC unit 525, and memory devices 505 and 510. System 500 can also include any number of other components which are not shown to avoid obscuring the figure. Similar to apparatus 400 (of FIG. 4), memory devices 505 and 510 use different levels of error protection for data stored in their devices. It is assumed for the purposes of this discussion that memory device 505 has a higher level of protection than memory device 510, and it is assumed that memory device 505 has a relatively larger error section 505B compared to error section 510B of memory device 510.

It is also assumed for the purposes of this discussion that scatter unit 520 receives floating point number 530 along with a request for floating point number 530 to be stored in one or more memory devices. As shown at the bottom of FIG. 5, floating point number 530 includes sign field 530A, exponent field 530B, and mantissa field 530C. In one implementation, scatter unit 520 partitions incoming floating point number 530 such that sign field 530A, exponent field 530B, and mantissa field portion 530D are stored in data section 505A of memory device 505. ECC unit 525 generates the error bits 530F for sign field 530A, exponent field 530B, and mantissa field portion 530D that will be stored in error section 505B. The location of ECC unit 525 can vary according to the implementation, as was previously noted in regard to ECC unit 425 of apparatus 400 (of FIG. 4). The number of bits in mantissa field portion 530D can vary according to the implementation and based on various factors. Also, the least significant bits (LSBs) in mantissa field portion 530E are stored in data section 510A of memory device 510 while corresponding error bits 530G are stored in error section 510B.

In one implementation, control unit 535 determines how many of the most significant bits (MSBs) of mantissa field 530C are included in mantissa field portion 530D which are stored in memory device 505. In one implementation, the number of mantissa field MSBs that are included in mantissa field portion 530D are fixed. In another implementation, the number of mantissa field MSBs that are included in mantissa field portion 530D are variable. In this implementation, control unit 535 determines how many MSBs to include in mantissa field portion 530D based on the occupancy of memory device 505, the current state of the program or application processing the floating point values, and/or other factors. For example, in one implementation, as the occupancy of memory device 505 increases, the number of mantissa field MSBs sent to memory device 505 decreases. Also, in another implementation, when the floating point numbers are processed by a machine learning model, inference model, or other artificial intelligence (AI) model undergoing training, control unit 535 can increase the number of mantissa field MSBs sent to memory device 505 as the training progresses and more accuracy is needed. Alternatively, if control unit 535 detects or receives an indication that training is stalled, control unit 535 can increase the number of mantissa field MSBs sent to memory device 505 to increase accuracy of the training results. Indications of how values have been partitioned by control unit 535 are stored in table 540 in one implementation. When reconstructing values, control unit 535 accesses table 540 to determine how the values were partitioned so as to reverse the partitioning.

Figure 6:
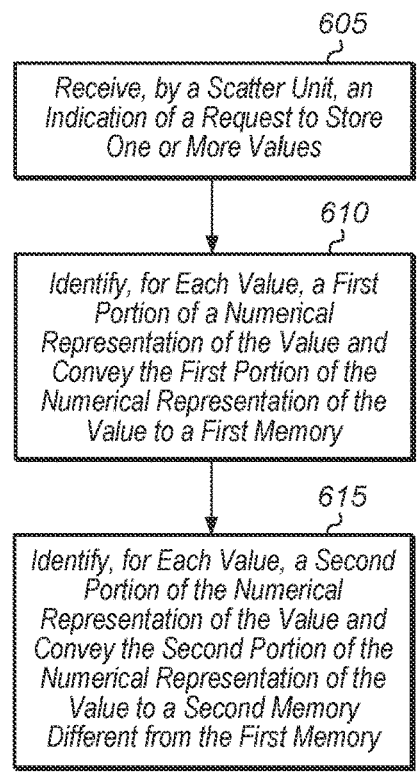
FIG. 6 is a generalized flow diagram illustrating one implementation of a method for scattering portions of number representation values to multiple memories.
Figure 7:
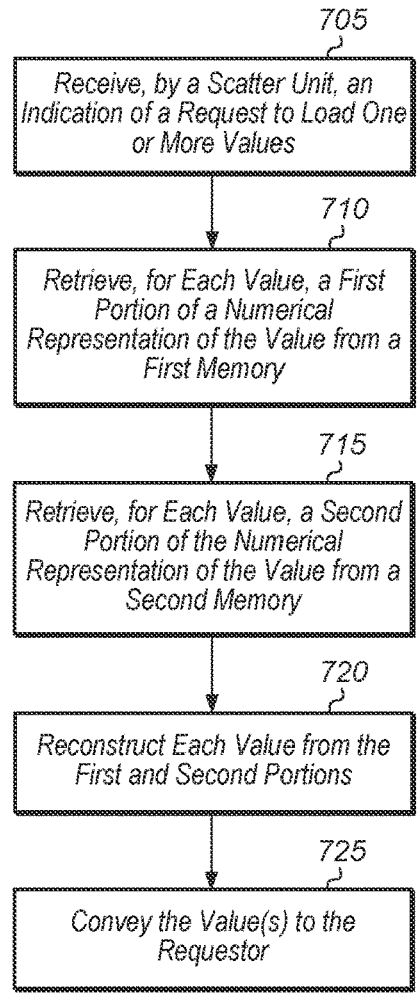
FIG. 7 is a generalized flow diagram illustrating one implementation of a method for retrieving scattered portions of number representation values from multiple memories.
Figure 8:
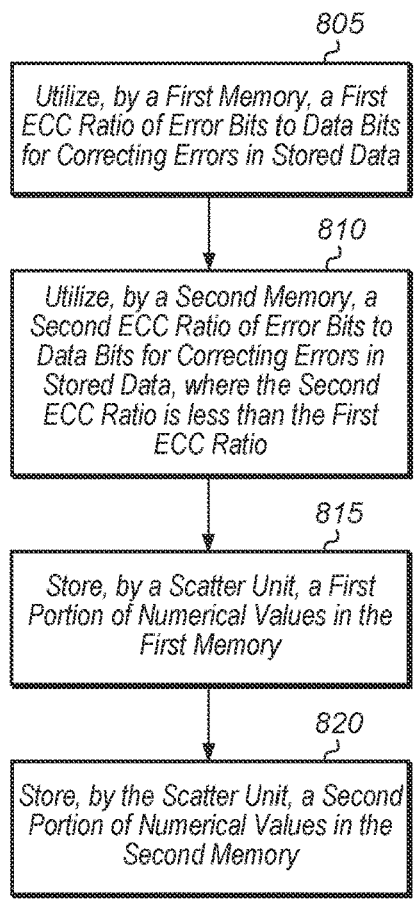
FIG. 8 is a generalized flow diagram illustrating one implementation of a method for utilizing heterogeneous error correcting memory devices.
Figure 9:
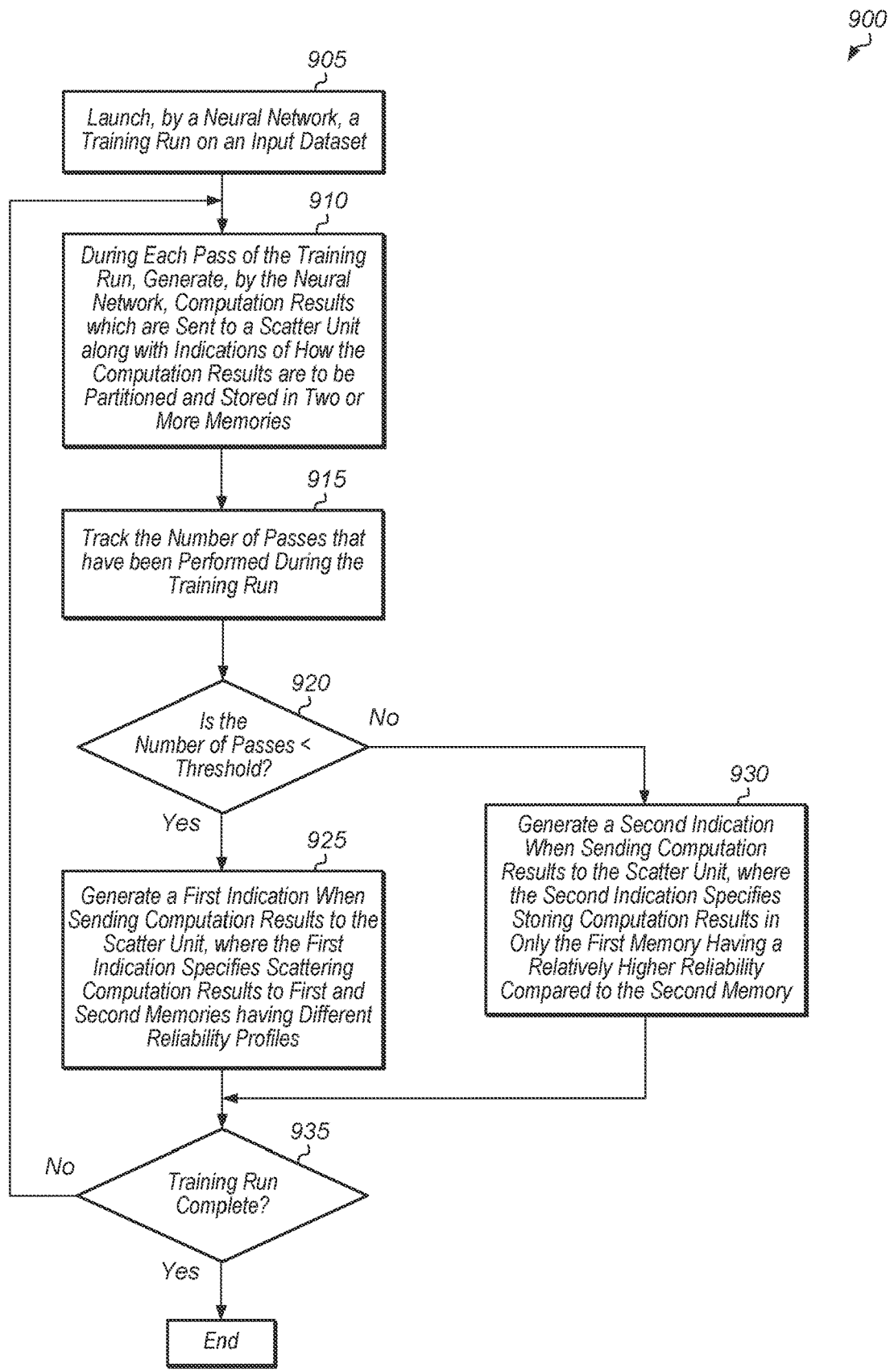
FIG. 9 is a generalized flow diagram illustrating one implementation of a method for a neural network generating indications specifying how to store computation results based on numbers of passes executed.

Turning now to FIG. 6, one implementation of a method 600 for scattering portions of number representation values to multiple memories is shown. For purposes of discussion, the steps in this implementation and those of FIG. 7-9 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 600 (and methods 700-900).

A scatter unit (e.g., scatter unit 420 of FIG. 4) receives an indication of a request to store one or more values (block 605). In one implementation, the indication is an explicit instruction for scattering each of the one or more values to multiple memories. In another implementation, the indication is an instruction for storing the one or more values without any indication specifying how or if to scatter the value(s) to multiple memories. In other implementations, other types of indications can be received by the scatter unit.

In response to receiving the indication of the request to store the one or more values, the scatter unit identifies and conveys, for each value, a first portion of a numerical representation of the value to a first memory (block 610). In one implementation, the first portion includes the sign bit field and the exponent field of a floating point representation of the value. In other implementation, the first portion includes other fields and/or bits of various fields of other types of numerical representations besides floating point representations. In one implementation, the first memory utilizes a first error correction code (ECC) ratio of error bits to data bits which achieves a relatively high error correction capability.

Also in response to receiving the indication of the request to store the one or more values, the scatter unit identifies and conveys, for each value, a second portion of the numerical representation of the value to a second memory different from the first memory (block 615). It is noted that blocks 610 and 615 can be performed in parallel in one implementation. After block 615, method 600 ends. In one implementation, the second portion includes the mantissa field of a floating point representation of the value. In other implementation, the second portion includes other fields and/or bits of various fields of other types of numerical representations besides floating point representations. In one implementation, the second memory utilizes a second ECC ratio of error bits to data bits which achieves a relatively low error correction capability. In other words, the second ECC ratio is less than the first ECC ratio.

Referring now to FIG. 7, one implementation of a method 700 for retrieving scattered portions of numerical representation values from multiple memories is shown. A scatter unit receives an indication of a request to load (i.e., read) one or more values (block 705). In one implementation, the indication is an explicit instruction for loading the one or more values, each of which has been scattered to multiple memories. In another implementation, the indication is a generic instruction for loading the one or more values, with the indication not including any indication that the value(s) will need to be retrieved from multiple memories. In other implementations, other types of indications can be received by the scatter unit.

In response to receiving the indication of the request to load one or more values, the scatter unit retrieves, for each value, a first portion of a numerical representation of the value from a first memory (block 710). Also in response to receiving the indication of the request to load one or more values, the scatter unit retrieves, for each value, a second portion of a numerical representation of the value from a second memory (block 715). Next, the scatter unit reconstructs each value from the first and second portions (block 720). Then, the scatter unit conveys the value(s) to the requestor (block 725). After block 725, method 700 ends.

Turning now to FIG. 8, one implementation of a method 800 for utilizing heterogeneous error correcting memory devices is shown. A first memory utilizes a first error correction code (ECC) ratio of error bits to data bits for correcting errors in stored data (block 805). A second memory utilizes a second ECC ratio of error bits to data bits for correcting errors in stored data, where the second ECC ratio is less than the first ECC ratio (block 810). In other words, the first memory provides better protection against errors for the data stored in the first memory than the second memory does for the data stored in the second memory. It is noted that the terms "first memory" and "second memory" refer to separate regions of memory, with the separate regions being in different devices in some implementations or on the same device in other implementations.

A scatter unit stores a first portion of numerical values in the first memory (block 815). The scatter unit stores a second portion of numerical values in the first memory (block 820). After block 820, method 800 ends. In one implementation, the first portion includes the sign field and the exponent field of a floating point representation, and the second portion the mantissa field. In other implementations, the first portion and the second portion can be defined differently for floating point representations. Also, in further implementations, for other types of number formats besides floating point representations, the first and second portions can be defined in any of various ways to assign more critical data to the first memory and less critical data to the second memory.

Referring now to FIG. 9, one implementation of a method 900 for a neural network generating indications specifying how to store computation results based on numbers of passes executed is shown. A neural network launches a training run on an input dataset (block 905). The type of neural network can vary according to the embodiment, with inference engines, machine learning (ML) engines, artificial intelligence (AI) engines, and other types of engines used in various different scenarios. It is noted that these terms (i.e., neural network, inference engine, ML engine, AI engine) can be used interchangeably herein. It is also noted that the type of data in the input dataset can vary from embodiment to embodiment, with image data, video data, language data, financial data, simulation data, transaction data, and other types of data being processed.

During each pass of the training run, the neural network generates computation results which are sent to a scatter unit along with indications of how the computation results are to be partitioned and stored in two or more memories (block 910). Each pass refers to the input dataset traversing the plurality of layers of the neural network. In some cases, a pass is a forward traversal of the neural network, while in other cases, a pass is a forward and backward traversal of the neural network. Also, the neural network tracks the number of passes that have been performed during the training run (block 915). Alternatively, in another embodiment, the neural network tracks how close the convergence goal or convergence target is to being reached. In other embodiments, the neural network uses other metrics to track the progress of the training run.

If the number of passes is less than a threshold (conditional block 920, "yes" leg), then the neural network generates a first indication when sending computation results to the scatter unit, where the first indication specifies scattering computation results to first and second memories having different reliability profiles (block 925). For example, in one implementation, when the computation results are in the floating point format, the first indication specifies storing sign and exponent fields of each computation result in the first memory while storing the mantissa field of each computation result in the second memory, where the second memory is less reliable than the first memory. The determination of reliability can be based on any of a variety of characteristics associated with the first and/or second memories. Examples of characteristics used for generating a measure/estimate of reliability of a memory region or memory device include, but are not limited to, the strength of the ECC used to detect and correct errors, the number of ECC bits used per data chunk, the amount of redundancy used for storing data, the age of the memory device, and the number of write-cycles undergone. In other implementations, the computation results can be encoded in other types of formats besides floating point.

It is noted that the value of the threshold used in conditional block 920 can vary from embodiment to embodiment. Also, in another embodiment, rather than specifying the threshold in terms of number of passes, the threshold can be expressed in terms of a percentage achieved toward convergence. For example, in this implementation, the threshold could be expressed as having reached 70% of the convergence target or convergence goal. In other embodiments, the threshold can be specified using other types of metrics. If the number of passes is greater than or equal to the threshold (conditional block 920, "no" leg), then the neural network generates a second indication when sending computation results to the scatter unit, where the second indication specifies storing computation results in only the first memory having a relatively higher reliability compared to the second memory (block 930). The rationale behind generating the second indication later on in the training run is that more precision may be needed as the neural network gets closer to convergence. Therefore, the computation results would only be stored in the first memory later in the training run. If the training run is complete (conditional block 935, "yes" leg), then method 900 ends. Otherwise, if the training run is not complete (conditional block 935, "no" leg), then method 900 returns to block 910.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (I-DL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   a first memory;
   a second memory, wherein the second memory has at least one characteristic indicating a lower reliability than the first memory; and
   a scatter unit comprising circuitry, wherein responsive to receiving a request to store a first numerical value that is encoded in a floating point format comprising a plurality of fields, the scatter unit is configured to:
      convey a first portion of the numerical value to the first memory, the first portion comprising one or more of the plurality of fields; and
      convey a second portion of the numerical value to the second memory, the second portion comprising fields of the plurality of fields not included in the first portion.

2. The apparatus as recited in claim 1, wherein the scatter unit is further configured to store an indication that the numerical value has been scattered to both the first memory and the second memory, wherein the first memory uses a first amount of redundancy for storing data, and wherein the second memory uses a second amount of redundancy different than the first amount of redundancy.

3. The apparatus as recited in claim 1, wherein the at least one characteristic indicating the lower reliability of the second memory comprises at least one of an age of the second memory, a number of write cycles undergone by the second memory, a strength of an error correcting code (ECC) used to detect and correct errors, a number of ECC bits used per data chunk, or an amount of redundancy used for storing data.

4. The apparatus as recited in claim 1, wherein the plurality of fields contains a sign field, an exponent field, and a mantissa field.

5. The apparatus as recited in claim 4, wherein the first portion comprises a sign field, an exponent field, and one or more most significant bits (MSBs) of a mantissa field identified by the scatter unit, and wherein the second portion comprises a plurality of least significant bits (LSBs) of the mantissa field identified by the scatter unit.

6. The apparatus as recited in claim 1, wherein responsive to receiving a request to read the numerical value, the scatter unit is configured to:
   retrieve the first portion of the numerical value from the first memory; and
   retrieve the second portion of the numerical value from the second memory.

7. The apparatus as recited in claim 1, further comprising a dual-mode error correction code (ECC) unit configured to generate at least two sets of codes for detecting and correcting errors in stored data, and wherein:
   the first memory utilizes a first error correction code (ECC) ratio of error bits to data bits; and
   the second memory utilizes a second ECC ratio of error bits to data bits, wherein the second ECC ratio is less than the first ECC ratio.

8. A method comprising:
   receiving, by a scatter unit, a request to store a first numerical value that is encoded in a floating point format comprising a plurality of fields;
   conveying a first portion of the numerical value to a first memory, the first portion comprising one or more of the plurality of fields; and
   conveying a second portion of the first numerical value to a second memory that is less reliable than the first memory, the second portion comprising fields of the plurality of fields not included in the first portion.

9. The method as recited in claim 8, further comprising conveying the first and second portions to the first memory and the second memory, respectively, based on an explicit software instruction.

10. The method as recited in claim 9, further comprising an inference engine conveying the numerical value to the scatter unit with a first indication to scatter a computation result, generated by the inference engine, to the first and second memories.

11. The method as recited in claim 10, further comprising the inference engine generating the first indication in response to a number of passes being less than a threshold, wherein the number of passes refers to a number of traversals of a set of input data through a plurality of layers of the inference engine.

12. The method as recited in claim 10, further comprising the inference engine generating a second indication in response to a number of passes being greater than or equal to a threshold, wherein the second indication specifies that computation results should only be stored in the first memory.

13. The method as recited in claim 8, wherein responsive to receiving a request to read the numerical value, the method further comprising:
retrieving the first portion of the numerical value from the first memory; and
retrieving the second portion of the numerical value from the second memory.

14. The method as recited in claim 8, wherein:
the first memory utilizes a first error correction code (ECC) ratio of error bits to data bits; and
the second memory utilizes a second ECC ratio of error bits to data bits, wherein the second ECC ratio is less than the first ECC ratio.

15. A system comprising:
an inference engine comprising circuitry; and
a scatter unit comprising circuitry configured to:
receive, from the inference engine, a request to store a numerical value;
partition the numerical value in to at least a first portion and a second portion, responsive to an indication received from the inference engine;
convey the first portion of the numerical value to a first memory; and
convey the second portion of the numerical value to a second memory.

16. The system as recited in claim 15, wherein the scatter unit is further configured to store an indication that the numerical value has been scattered to both the first memory and second memory.

17. The system as recited in claim 15, wherein the first memory has a higher reliability than the second memory.

18. The system as recited in claim 17, wherein the first portion comprises a sign field, an exponent field, and one or more most significant bits (MSBs) of a mantissa field, and wherein the second portion comprises a plurality of least significant bits (LSBs) of the mantissa field.

19. The system as recited in claim 15, wherein the numerical value is encoded in a floating point format, wherein the first portion comprises a sign field and an exponent field, and wherein the second portion comprises a mantissa field.

20. The system as recited in claim 15, wherein:
the first memory utilizes a first error correction code (ECC) ratio of error bits to data bits; and
the second memory utilizes a second ECC ratio of error bits to data bits, wherein the second ECC ratio is less than the first ECC ratio.

* * * * *